Sept. 4, 1962    R. GOLDIN    3,052,121
AIRCRAFT PILOT INSTRUMENT
Filed Nov. 12, 1958
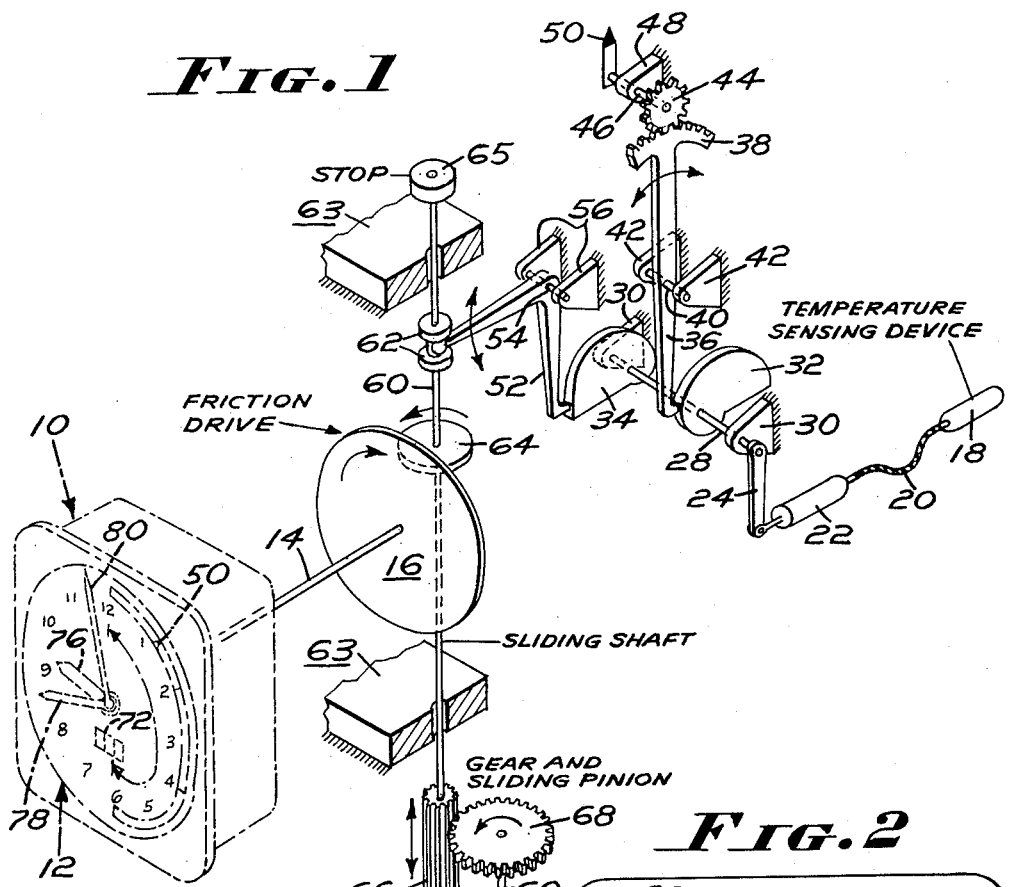
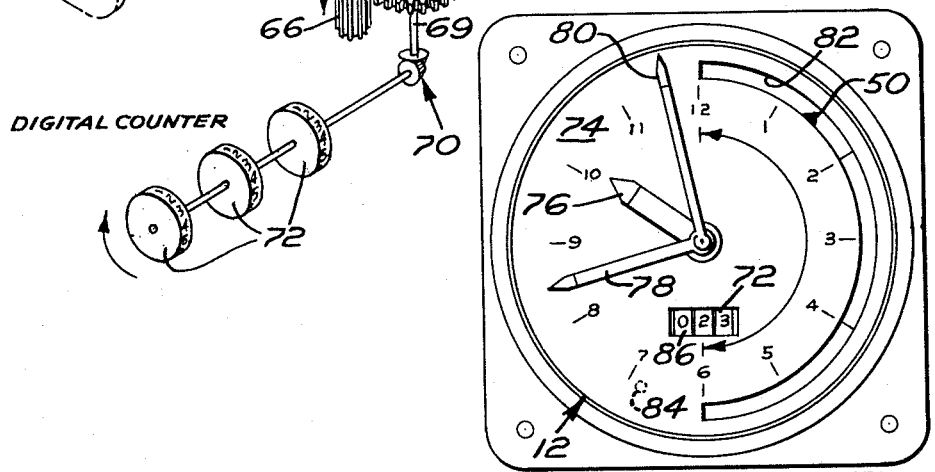
INVENTOR:
ROBERT GOLDIN
BY:
Beau, Brooks, Buckley & Beau,
ATTORNEYS.

United States Patent Office 3,052,121
Patented Sept. 4, 1962

3,052,121
AIRCRAFT PILOT INSTRUMENT
Robert Goldin, Snyder, N.Y., assignor, by mesne assignments, to Bell Aerospace Corporation, Wheatfield, N.Y., a corporation of Delaware
Filed Nov. 12, 1958, Ser. No. 773,502
5 Claims. (Cl. 73—178)

This invention relates to aircraft piloting instruments, and more particularly to a new and novel type of instrument which will serve to provide a pilot with an indication of the thermal condition of the aircraft at any given moment and of how long the craft may safely continue to operate under such condition in view of the thermal effect on the structure of the aircraft; as well as an indication as to what extent the operational life of the aircraft has been expended by the cumulative effects of the high temperatures to which the aircraft has been exposed during the present and previous missions. Hereinafter the instrument of the invention is referred to as a thermal time indicator.

As is well known in the industry, one of the major problems encountered in the design and operation of modern high speed aircraft is the severe thermal stress to which an aircraft is subjected, due to the high temperatures generated by air frictional effects under high speed flight conditions. Two factors of primary importance in the operation of aircraft under high temperature conditions are the maximum temperature which the structural materials of an aircraft will withstand without immediate failure, and the cumulative effect on the aircraft structure of repeated exposures to temperatures below the point of immediate failure but high enough to have fatigue effects.

Accordingly the primary object of the invention is to provide an instrument which will provide the aircraft pilot and maintenance personnel with information relating to the above mentioned factors in such manner as to be of assistance in operating and maintaining the aircraft in safe and expedient manner.

Another object of the invention is to provide such an instrument which will present the desired information in such manner as to be easily and immediately understood without need of calculation on the part of the observer.

A further object of the invention is to provide a thermal time indicator as aforesaid which will be self-powered and therefore independent of the regular power systems of an aircraft.

Other objects and advantages of the invention will appear in the specification hereinafter.

In the drawings:

FIG. 1 is a schematic illustration in perspective showing the elements of the instrument of the invention and how they are inter-related; and FIG. 2 is a face view of the indicating dial portion of the instrument.

As indicated above, it is the primary purpose of the invention to provide two direct readings relevant to the thermal environment in whch it is operating at the time the reading is taken. The first reading is for the purpose of indicating the length of time in minutes for which the aircraft may be safely operated under the structural temperature conditions existing at the time the indicator is read. As a practical matter it is desirable to design and operate an aircraft with a certain "life expectancy" in mind. This "life expectancy" may be expressed as a specified number of flights or missions. In such case the "minutes permissible" indicating device will be calibrated so as to show a "minutes permissible per mission" indication, rather than the total minutes permissible for the entire thermal life of the aircraft. The second reading provided by the instrument of the invention shows how much of the total thermal life of the aircraft has so far been expended. This may advantageously be shown as a percentage of the total life.

Broadly speaking, the readings given by the thermal time indicator will be resultant of time and temperature modified by the heat tolerance characteristics of the aircraft structure. First, of course, the thermal tolerance characteristics of the structural material used in the aircraft must be ascertained. This information may be determined by laboratory tests and calculations. It is then possible to plot the ratio of permissible minutes of exposure (per mission) to structural temperature. The primary relationship expressed by the curve obtained is "minutes permissible" at a certain temperature. Suitable cam members are then accurately formed to the shape of the resultant curve and are employed in the instrument as shown in FIG. 1 as will be explained hereinafter.

The particular embodiment of the invention shown in the drawings herewith shows the means for obtaining both of the desired indications combined in a single instrument which employs a conventional mechanical clock as indicated at 10, having an indicating face designated generally at 12. A shaft 14 is connected to and extends from the minute hand drive shaft of the clock and is fixed at its other end to a drive wheel 16. A temperature sensing device such as a temperature sensing bulb as indicated at 18 is located at a suitable station such as in the wing structure of the aircraft. The bulb 18 is connected by means of hydraulic line 20 to a piston cylinder unit 22 which actuates a crank 24. The crank arm 24 is keyed to a shaft 28 which is mounted for rotation in bearings 30, 30. Cam members 32 and 34, prepared as explained hereinabove, are keyed to the shaft 28 to extend therefrom in diametrically opposed relation. A follower arm 36, one end of which engages the cam 32, is pivotally mounted by pin 40 on fixed brackets 42 and terminates at its other end in a gear segment 38. A pinion gear 44 engages the gear 38 and is fixed to shaft 46 which is mounted for rotation in trunnion 48 and carries the indicating needle 50 fixed to its other end.

A second follower arm 52 engages the cam 34 and is pivotally mounted on pin 54 which is carried by brackets 56, 56. As shown, the follower arm 52 is of bell crank form and engages at its other end between spaced flanges 62, 62 carried by a shaft 60. The shaft 60 is rotatably supported by bearing blocks 63, 63 in such manner as to permit the shaft to be axially shifted in either direction. A wheel 64 is fixed to the sliding shaft 60 and frictionally engages at its periphery the face of drive wheel 16; the position of contact of the wheel 64 with the wheel 16 being radially variable on the face of the wheel 16 depending upon the angular position of the bell crank 52 which varies as the cam 34 rotates in response to temperature changes sensed by the bulb 18. An elongate pinion 66 is fixed to the lower end of the shaft 60 and meshes with the gear 68 which is connected through driving shaft 69 and gear train 70 to a digital counter schematically indicated by the counter wheels 72.

FIG. 2 shows the face of the instrument designated generally at 12, having a conventionally numbered clock dial 74 and a conventional hour hand 76; minute hand 78; and second hand 80. The "minutes" permissible indicator and percent of life expended indicator are incorporated in the clock face as follows: An arcuate window 82 extends around the right-hand side of the clock dial and the minutes permissible indicating needle 50 is visible therethrough. The gearing which drives this needle 50 is so designed that the conventional hour indicia on the clock face adjacent the window 82 serve also as the "minutes permissible" calibrations. A stop pin 84 is provided to be behind the clock dial 74 at approximately the seven o'clock position to limit the sweep of the needle 50 when the aircraft is idle or operating under low temperature conditions. In addition, a window 86 is provided in the clock face through which the percentage of life expended indicator 72 is visible. As previously mentioned the percentage of life indicator shows at all times what percentage of the total thermal life of the aircraft has been expended up to the time of reading.

In operation the instrument will function as follows:

Before each flight the clock will be set and started and will run continuously. Thus, shaft 14 and drive wheel 16 will also rotate continuously. The temperature sensing bulb and actuating cylinder 22 are calibrated so that no actuating movement is imparted to the instrument until the aircraft structure reaches a temperature which will affect the thermal life of the aircraft. Until this point is reached, the "minutes permissible" needle 50 will rest out of sight against the stop 84 and the friction wheel 64 will be at dead center of the drive wheel 16 so that the counting wheels 72 will not operate. However, as soon as the aircraft structure reaches a temperature significant to the life of the aircraft, the temperature sensing bulb 18 will, through hydraulic line 20, cause the actuating cylinder 22 to impart motion to the crank 24 and thereby cause the shaft 28 and cams 32 and 34 to rotate in direct proportion to the temperature of the aircraft structure. As explained hereinabove, the shape of the cams correspond to a curve based on the thermal life of the structural material of the aircraft and the cam followers will therefore be moved in accordance therewith. The position of the cams shown in FIG. 1 will be reached at a relatively high structural temperature. The cam 32 has been rotated to a point where the follower arm 36 is in contact with the cam at a point of relatively small radius and this has caused the gears 38 and 44 to move the minutes permissible needle to a nearly vertical position. This will give a relatively low reading on the minutes permissible indicator. At the same time, the cam 34, which is keyed to the shaft 28 in reversed relation to cam 32, has been rotated to a point where the follower arm 52 is in contact with cam 34 at a point of relatively high radius. This relatively large displacement of the follower arm 52 causes a corresponding movement of the sliding shaft 60 which moves frictional wheel 64 to a point of contact with drive wheel 16 which again represents a relatively large radius. This obviously results in relatively high speed rotation of the wheel 64 and therefore the pinion 66, gear arrangements 68 and 70 and the counter 72. Thus the high temperature sensed by the bulb results in a low minutes permissible reading and, correspondingly, a high rate of recording of usage of percent of thermal life. It will be apparent that the indicator 50 also gives indication of how close the aircraft is to the point of immediate structural failure inasmuch as failure is anticipated to occur when the needle 50 attains the zero minutes or twelve o'clock position on the dial. Thus a relatively uncomplicated instrument of a thoroughly practical type is provided for the purpose of giving the operating and maintenance personnel of an aircraft an accurate indication of the condition of a given aircraft in regard to its thermal life.

Although only one form of the instrument of the invention has been illustrated and described hereinabove, it will be understood that various changes may be made therein without departing from the spirit of the invention or the scope of the following claims.

I claim:

1. In combination, an aircraft instrument comprising, a casing including a face calibrated in units of time, a clock mechanism having time lapse indicators sweeping said calibrated face, temperature change sensing means mounted in heat exchange relation with an aircraft structure subjected to elevated temperatures when operational, variable cam means operably connecting with said temperature sensing means to move in response to operation thereof and coupled to an indicator needle sweeping said calibrated face whereby said indicator is caused to move with respect to the calibrations of said face in response to changes in the aircraft structure temperature, a second variable cam means connected to be operable also in response to changes in temperature sensed by said sensing means, a digital counter, and variable speed driving linkage regulated by said second cam means and correspondingly controlling rate of motion of said counter indicating total accumulated expenditures of available thermal life of said aircraft structure.

2. In combination, an aircraft instrument comprising, a casing including a face arcuately calibrated in units of time, a clock mechanism having time lapse indicators sweeping said calibrated face, temperature change sensing means mounted in heat exchange relation with an aircraft structure subjected to elevated temperatures when operational, variable cam means operably connecting with said temperature sensing means to move in response to operation thereof and coupled to a "minutes permissible" indicator sweeping said calibrated face whereby said indicator is caused to move with respect to the calibrations of said face in response to changes in the aircraft structure temperature, a second variable cam means connected to be operable also in response to changes in temperature sensed by said sensing means, a digital counter, and variable speed driving linkage regulated by said second cam means and correspondingly controlling rate of motion of said counter indicating total accumulated expenditures of available thermal life of said aircraft structure, both of said cam means having their contacted faces shaped to correspond to the curve obtained by plotting the time of exposure permissible for the specific structural materials used in an aircraft in which the instrument is to be used against structure temperature.

3. In combination, an aircraft instrument comprising, a casing including a face arcuately calibrated in units of time a clock mechanism having time lapse indicators sweeping said calibrated face, a "time permissible" indicator sweeping said dial, a "time expended" indicator sweeping said dial, temperature change sensing means mounted in heat exchange relation with an aircraft structure subjected to elevated temperatures when operational, variable cam and displacement transmission means operably connecting said temperature sensing means to said "time permissible" indicator whereby said indicator is caused to move with respect to the calibrations of said face in response to changes in the aircraft structure temperature, a second variable cam means operably connected also to said temperature sensing means and connected to regulate the position of said "time expended" indicator of available thermal life of said aircraft structure.

4. In combination, an aircraft instrument comprising, a casing including a dial face arcuately calibrated in units of time a clock mechanism having time lapse indicators sweeping said calibrated face, a "time permissible" indicator sweeping said dial, a "time expended" indicating counter mounted in said casing and visible through said dial, temperature change sensing means mounted in heat exchange relation with an aircraft structure subjected to elevated temperatures when operational, variable cam means and displacement transmission means operably connecting said temperature sensing means to said "time permissible" indicator whereby said indicator is caused to move with respect to the calibrations of said face in response to changes in the aircraft structure temperature, a second variable cam means operably connected also to said temperature sensing means and connected to control the speed of said counter device, and a constant-speed elapsed time indicator sweeping said dial and driven by a constant speed motor.

5. An aircraft instrument comprising, a casing adapted to be mounted in an aircraft, said casing having a face calibrated in units of time, a constant-speed motor driving a clock mechanism mounted in said casing and having hands sweeping said calibrated face, temperature sensing means adapted to be mounted in heat exchange relation with a structural part of an aircraft, an indicating needle adapted to sweep at least a portion of said face for indicating for the structural part permissible amount of time at the current temperature, a digital counter mounted in said casing, a variable speed driving linkage driven by said constant-speed motor to operate said counter between zero and maximum speed, cam means connected to said variable speed driving linkage and normally establishing zero speed drive to said counter, said cam means also being connected to said indicating needle to sweep the same as aforesaid and normally establishing a maximum position of said indicating needle, said temperature sensing means being connected to said cam means for actuating the latter in response to temperature of the structural part above a predetermined threshold value to vary the drive speed to said counter and to vary the position of said indicating needle.

References Cited in the file of this patent

UNITED STATES PATENTS

| | | |
|---|---|---|
| 1,877,810 | Chamberlain | Sept. 20, 1932 |
| 1,977,498 | Staegemann | Oct. 16, 1934 |
| 2,114,185 | Havourd et al. | Apr. 12, 1938 |
| 2,138,941 | Roudanez | Dec. 6, 1938 |
| 2,472,795 | Dunn | June 14, 1949 |
| 2,505,521 | Boyajian | Apr. 25, 1950 |